United States Patent
Pezeshki et al.

(10) Patent No.: US 12,309,780 B2
(45) Date of Patent: May 20, 2025

(54) AVOIDING COLLISIONS WITH REFERENCE SIGNALS

(71) Applicant: QUALCOMM Incorporated, San Diego, CA (US)

(72) Inventors: Hamed Pezeshki, San Diego, CA (US); Tao Luo, San Diego, CA (US); Arumugam Chendamarai Kannan, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/182,267

(22) Filed: Mar. 10, 2023

(65) Prior Publication Data

US 2023/0337236 A1    Oct. 19, 2023

Related U.S. Application Data

(63) Continuation of application No. 16/949,247, filed on Oct. 21, 2020, now Pat. No. 11,617,163.

(Continued)

(51) Int. Cl.
*H04L 5/00*      (2006.01)
*H04W 72/20*     (2023.01)

(52) U.S. Cl.
CPC ........... *H04W 72/20* (2023.01); *H04L 5/0048* (2013.01)

(58) Field of Classification Search
CPC ....... H04L 5/00; H04L 5/0048; H04L 5/0062; H04L 5/0051; H04L 27/26; H04L 5/10;

(Continued)

(56) References Cited

U.S. PATENT DOCUMENTS 9,060,321 B2 *   6/2015   Ng .................... H04W 56/00
9,712,302 B2 *   7/2017   He .................... H04L 27/2692

(Continued)

FOREIGN PATENT DOCUMENTS

CN    101646239 A    2/2010
CN    101925118 A    12/2010

(Continued)

OTHER PUBLICATIONS

Ericsson: "Remaining Details on DL Data Channel Design", 3GPP Draft, 3GPP TSG-RAN WG1 Meeting #91, R1-1720526 Remaining Design Aspects of SPDSCH and DL DMRS, 3rd Generation Partnership Project (3GPP), Mobile Competence Centre, 650, Route Des Lucioles, F-06921 Sophia-Antipolis Cedex, vol. RAN WG1. No. Reno. USA, Nov. 27, 2017-Dec. 1, 2017 Nov. 17, 2017 (Nov. 17, 2017), XP051369020, pp. 1-12, p. 3, paragraph 3, p. 5, paragraph 3.1, p. 8, paragraph 3.2, p. 9, paragraph 5.

(Continued)

*Primary Examiner* — Man U Phan
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration for a semi-persistent scheduling (SPS) of a data transmission that rate matches the data transmission around one or more resource elements that are to be used for a cell-specific reference signal pattern. The UE may receive an SPS communication based at least in part on the configuration. Numerous other aspects are provided.

30 Claims, 15 Drawing Sheets

Related U.S. Application Data

(60) Provisional application No. 62/925,209, filed on Oct. 23, 2019.

(58) Field of Classification Search
CPC .......... H04W 72/042; H04W 72/0406; H04W 72/20; H04W 72/04
USPC ...................................................... 370/329
See application file for complete search history.

(56) References Cited

U.S. PATENT DOCUMENTS

| | | | |
|---|---|---|---|
| 9,979,520 | B2 | 5/2018 | Lee et al. |
| 10,123,224 | B2 | 11/2018 | Ramkumar et al. |
| 10,707,991 | B2 | 7/2020 | Kim et al. |
| 10,757,722 | B2 | 8/2020 | Kim et al. |
| 10,790,892 | B2 | 9/2020 | Manolakos et al. |
| 11,063,716 | B2* | 7/2021 | Kim ..................... H04L 1/00 |
| 11,128,428 | B2 | 9/2021 | Frenne et al. |
| 11,178,669 | B2 | 11/2021 | Zhang et al. |
| 11,228,398 | B2 | 1/2022 | Park et al. |
| 11,271,697 | B2* | 3/2022 | Kang ................... H04L 5/0053 |
| 11,272,518 | B2* | 3/2022 | Takeda ................. H04L 5/0096 |
| 11,310,020 | B2* | 4/2022 | Kim .................. H04L 27/2605 |
| 11,528,172 | B2* | 12/2022 | Kang ................... H04L 5/0048 |
| 11,533,156 | B2* | 12/2022 | Khoshnevisan .. H04W 72/0453 |
| 11,595,948 | B2 | 2/2023 | Chen et al. |
| 11,617,163 | B2 | 3/2023 | Pezeshki et al. |
| 11,979,233 | B2* | 5/2024 | Kim ................. H04W 72/1263 |
| 2013/0286967 | A1* | 10/2013 | Ji .......................... H04W 72/20 370/329 |
| 2014/0321370 | A1 | 10/2014 | Chen et al. |
| 2017/0055270 | A1 | 2/2017 | Caretti et al. |
| 2019/0334677 | A1 | 10/2019 | Hwang et al. |
| 2020/0382354 | A1* | 12/2020 | Sengupta ................ H04L 5/001 |
| 2021/0091915 | A1 | 3/2021 | Khoshnevisan et al. |
| 2021/0273742 | A1 | 9/2021 | Xu et al. |
| 2021/0328710 | A1 | 10/2021 | Zhou et al. |
| 2021/0344442 | A1 | 11/2021 | Jiang et al. |
| 2022/0124741 | A1* | 4/2022 | Elshafie ................ H04L 5/0094 |
| 2022/0131642 | A1* | 4/2022 | Kim ...................... H04L 5/0053 |
| 2022/0140954 | A1* | 5/2022 | Kim ...................... H04L 1/1861 370/329 |
| 2022/0150011 | A1* | 5/2022 | Kim ...................... H04L 5/0048 |
| 2022/0191081 | A1* | 6/2022 | Kim ...................... H04B 1/7156 |
| 2023/0155803 | A1* | 5/2023 | Khoshnevisan ...... H04W 72/53 370/329 |

FOREIGN PATENT DOCUMENTS

| | | |
|---|---|---|
| CN | 105101425 A | 11/2015 |
| CN | 106605442 A | 4/2017 |
| WO | 2015051212 | 4/2015 |
| WO | WO-2015158111 A1 | 10/2015 |
| WO | 2018057551 | 3/2018 |

OTHER PUBLICATIONS

International Search Report and Written Opinion—PCT/US2020/070684—ISA/EPO—Feb. 15, 2021.

ZTE: "Discussion on Rate Matching", 3GPP Draft, 3GPP TSG RAN WG1 Meeting NR#3, R1-1715436 Discussion on Rate Matching, 3rd Generation Partnership Project (3GPP), Mobile Competence Centre, 650, Route Des Lucioles, F-06921 Sophia-Antipolls Cedex, France, vol. RAN WG1. No. Nagoya, Japan, Sep. 18, 2017-Sep. 21, 2017 Sep. 12, 2017 (Sep. 12, 2017), XP051329365, pp. 1-3, p. 1, paragraph 2, p. 2, paragraph 2.2.

* cited by examiner

AVOIDING COLLISIONS WITH REFERENCE SIGNALS

CROSS-REFERENCE TO RELATED APPLICATION

This Patent Application is a continuation of U.S. Non-Provisional application Ser. No. 16/949,247, now U.S. Pat. No. 11,617,163, filed on Oct. 21, 2020, titled "AVOIDING COLLISIONS WITH REFERENCE SIGNALS," which claims priority to U.S. Provisional Patent Application No. 62/925,209, filed on Oct. 23, 2019, titled "AVOIDING COLLISIONS WITH REFERENCE SIGNALS," and assigned to the assignee hereof. The disclosures of the prior Applications are considered part of and are expressly incorporated by reference into this Patent Application in their entirety.

FIELD OF THE DISCLOSURE

Aspects of the present disclosure generally relate to wireless communication and to techniques and apparatuses for avoiding collisions with reference signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) includes receiving a configuration for a semi-persistent scheduling (SPS) of a data transmission that rate matches the data transmission around one or more resource elements that are to be used for a cell-specific reference signal (CRS) pattern; and receiving an SPS communication based at least in part on the configuration.

In some aspects, a method of wireless communication, performed by a base station, may include determining one or more resource elements that are to be used for a CRS pattern; determining a configuration for an SPS of a data transmission to a UE that rate matches the data transmission around the one or more resource elements of the CRS pattern; and transmitting the configuration to the UE.

In some aspects, a method of wireless communication, performed by a UE, may include receiving control information that schedules a first demodulation reference signal (DMRS) associated with a downlink data transmission so as to avoid a collision with a CRS in one or more first resource elements; determining, based at least in part on the control information, a potential collision, in the one or more first resource elements, between the CRS and a second DMRS associated with an SPS of a data transmission; determining that the second DMRS is to be received in one or more second resource elements based at least in part on the potential collision; and receiving the second DMRS in the one or more second resource elements.

In some aspects, a method of wireless communication, performed by a base station, may include determining that a first DMRS associated with a downlink data transmission is scheduled so as to avoid a collision with a CRS in one or more first resource elements; determining a potential collision, in the one or more first resource elements, between the CRS and a second DMRS associated with an SPS of a data transmission; and transmitting the second DMRS in one or more second resource elements based at least in part on the potential collision.

In some aspects, a UE for wireless communication may include memory and one or more processors operatively coupled to the memory. The memory and the one or more processors may be configured to receive a configuration for an SPS of a data transmission that rate matches the data transmission around one or more resource elements that are to be used for a CRS pattern; and receive an SPS communication based at least in part on the configuration.

In some aspects, a base station for wireless communication may include memory and one or more processors operatively coupled to the memory. The memory and the one or more processors may be configured to determine one or more resource elements that are to be used for a CRS pattern; determine a configuration for an SPS of a data transmission to a UE that rate matches the data transmission around the one or more resource elements of the CRS pattern; and transmit the configuration to the UE.

In some aspects, a UE for wireless communication may include memory and one or more processors operatively coupled to the memory. The memory and the one or more processors may be configured to receive control information that schedules a first DMRS associated with a downlink data transmission so as to avoid a collision with a CRS in one or more first resource elements; determine, based at least in part on the control information, a potential collision, in the one or more first resource elements, between the CRS and a second DMRS associated with an SPS of a data transmission; determine that the second DMRS is to be received in one or more second resource elements based at least in part on the potential collision; and receive the second DMRS in the one or more second resource elements.

In some aspects, a base station for wireless communication may include memory and one or more processors operatively coupled to the memory. The memory and the one or more processors may be configured to determine that a first DMRS associated with a downlink data transmission is scheduled so as to avoid a collision with a CRS in one or more first resource elements; determine a potential collision, in the one or more first resource elements, between the CRS and a second DMRS associated with an SPS of a data transmission; and transmit the second DMRS in one or more second resource elements based at least in part on the potential collision.

In some aspects, a non-transitory computer-readable medium may store one or more instructions for wireless communication. The one or more instructions, when executed by one or more processors of a UE, may cause the one or more processors to: receive a configuration for an SPS of a data transmission that rate matches the data transmission around one or more resource elements that are to be used for a CRS pattern; and receive an SPS communication based at least in part on the configuration.

In some aspects, a non-transitory computer-readable medium may store one or more instructions for wireless communication. The one or more instructions, when executed by one or more processors of a base station, may cause the one or more processors to: determine one or more resource elements that are to be used for a CRS pattern; determine a configuration for an SPS of a data transmission to a UE that rate matches the data transmission around the one or more resource elements of the CRS pattern; and transmit the configuration to the UE.

In some aspects, a non-transitory computer-readable medium may store one or more instructions for wireless communication. The one or more instructions, when executed by one or more processors of a UE, may cause the one or more processors to: receive control information that schedules a first DMRS associated with a downlink data transmission so as to avoid a collision with a CRS in one or more first resource elements; determine, based at least in part on the control information, a potential collision, in the one or more first resource elements, between the CRS and a second DMRS associated with an SPS of a data transmission; determine that the second DMRS is to be received in one or more second resource elements based at least in part on the potential collision; and receive the second DMRS in the one or more second resource elements.

In some aspects, a non-transitory computer-readable medium may store one or more instructions for wireless communication. The one or more instructions, when executed by one or more processors of a base station, may cause the one or more processors to: determine that a first DMRS associated with a downlink data transmission is scheduled so as to avoid a collision with a CRS in one or more first resource elements; determine a potential collision, in the one or more first resource elements, between the CRS and a second DMRS associated with an SPS of a data transmission; and transmit the second DMRS in one or more second resource elements based at least in part on the potential collision.

In some aspects, an apparatus for wireless communication may include means for receiving a configuration for an SPS of a data transmission that rate matches the data transmission around one or more resource elements that are to be used for a CRS pattern; and means for receive an SPS communication based at least in part on the configuration.

In some aspects, an apparatus for wireless communication may include means for determining one or more resource elements that are to be used for a CRS pattern; means for determining a configuration for an SPS of a data transmission to a UE that rate matches the data transmission around the one or more resource elements of the CRS pattern; and means for transmitting the configuration to the UE.

In some aspects, an apparatus for wireless communication may include means for receiving control information that schedules a first DMRS associated with a downlink data transmission so as to avoid a collision with a CRS in one or more first resource elements; means for determining, based at least in part on the control information, a potential collision, in the one or more first resource elements, between the CRS and a second DMRS associated with an SPS of a data transmission; means for determining that the second DMRS is to be received in one or more second resource elements based at least in part on the potential collision; and means for receiving the second DMRS in the one or more second resource elements.

In some aspects, an apparatus for wireless communication may include means for determining that a first DMRS associated with a downlink data transmission is scheduled so as to avoid a collision with a CRS in one or more first resource elements; means for determining a potential collision, in the one or more first resource elements, between the CRS and a second DMRS associated with an SPS of a data transmission; and means for transmitting the second DMRS in one or more second resource elements based at least in part on the potential collision.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
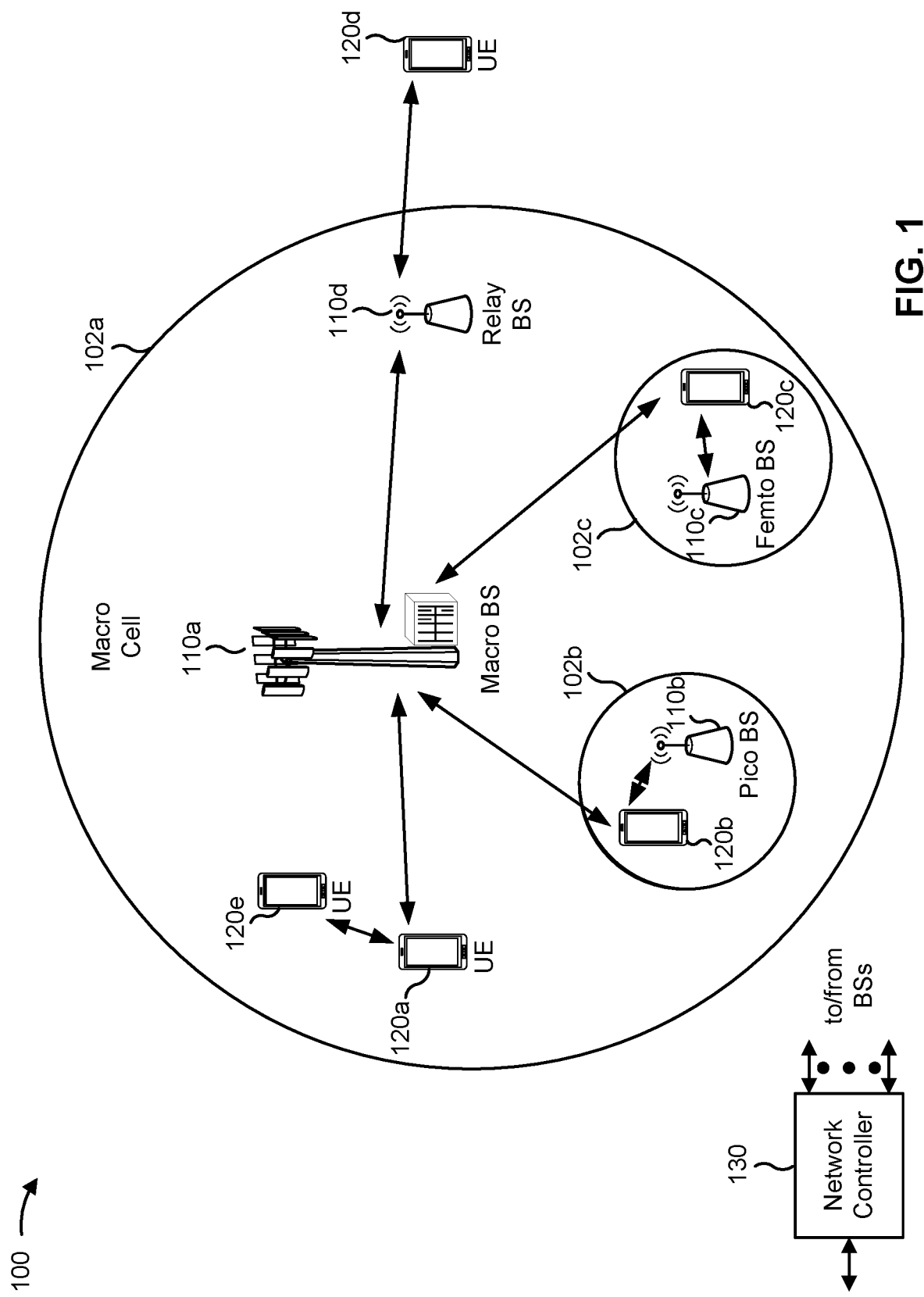
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay base station 110d may communicate with macro BS 110a and a UE 120d in order to facilitate communication between BS 110a and UE 120d. A relay base station may also be referred to as a relay BS, a relay station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
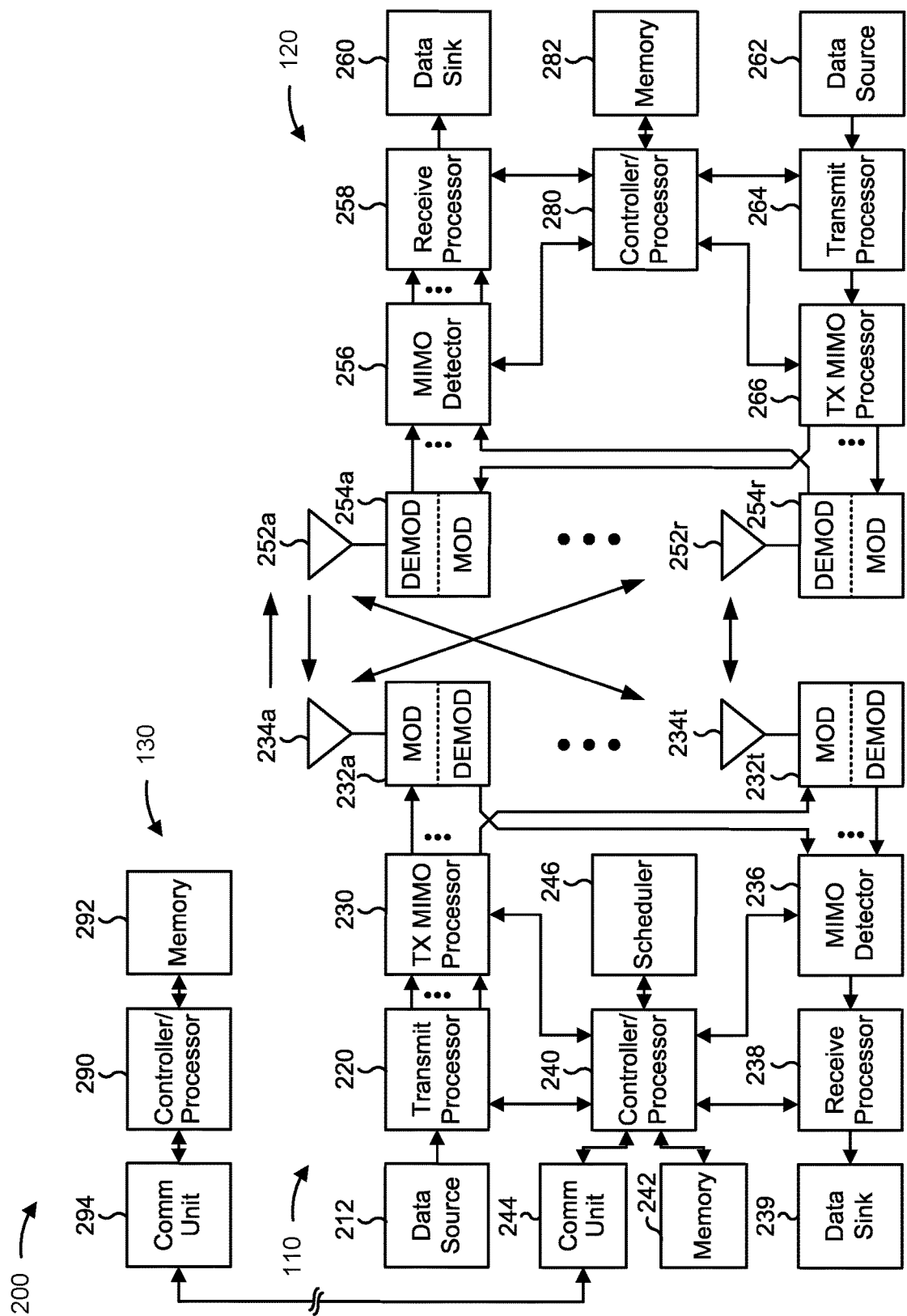
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with avoiding collisions with reference signals, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 900 of FIG. 9, process 1000 of FIG. 10, process 1100 of FIG. 11, and/or other processes as described herein. A scheduler 246 may schedule UEs for data transmission on the downlink and/or uplink.

In some aspects, base station 110 may include means for determining one or more resource elements that are to be used for a cell-specific reference signal (CRS) pattern, means for determining a configuration for a semi-persistent scheduling (SPS) of a data transmission to a UE that rate matches the data transmission around the one or more resource elements of the CRS pattern, means for transmitting the configuration to the UE, and/or the like. In some aspects, base station 110 may include means for determining that a first demodulation reference signal (DMRS) associated with a downlink data transmission is scheduled so as to avoid a collision with a CRS in one or more first resource elements, means for determining a potential collision, in the one or more first resource elements, between the CRS and a second DMRS associated with an SPS of a data transmission, means for transmitting the second DMRS in one or more second resource elements based at least in part on the potential collision, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, UE 120 may include means for receiving a configuration for an SPS of a data transmission that rate matches the data transmission around one or more resource elements that are to be used for a CRS pattern, means for receive an SPS communication based at least in part on the configuration, and/or the like. In some aspects, UE 120 may include means for receiving control information that schedules a first DMRS associated with a downlink data transmission so as to avoid a collision with a CRS in one or more first resource elements, means for determining, based at least in part on the control information, a potential collision, in the one or more first resource elements, between the CRS and a second DMRS associated with an SPS of a data transmission, means for determining that the second DMRS is to be received in one or more second resource elements based at least in part on the potential collision, means for receiving the second DMRS in the one or more second resource elements, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
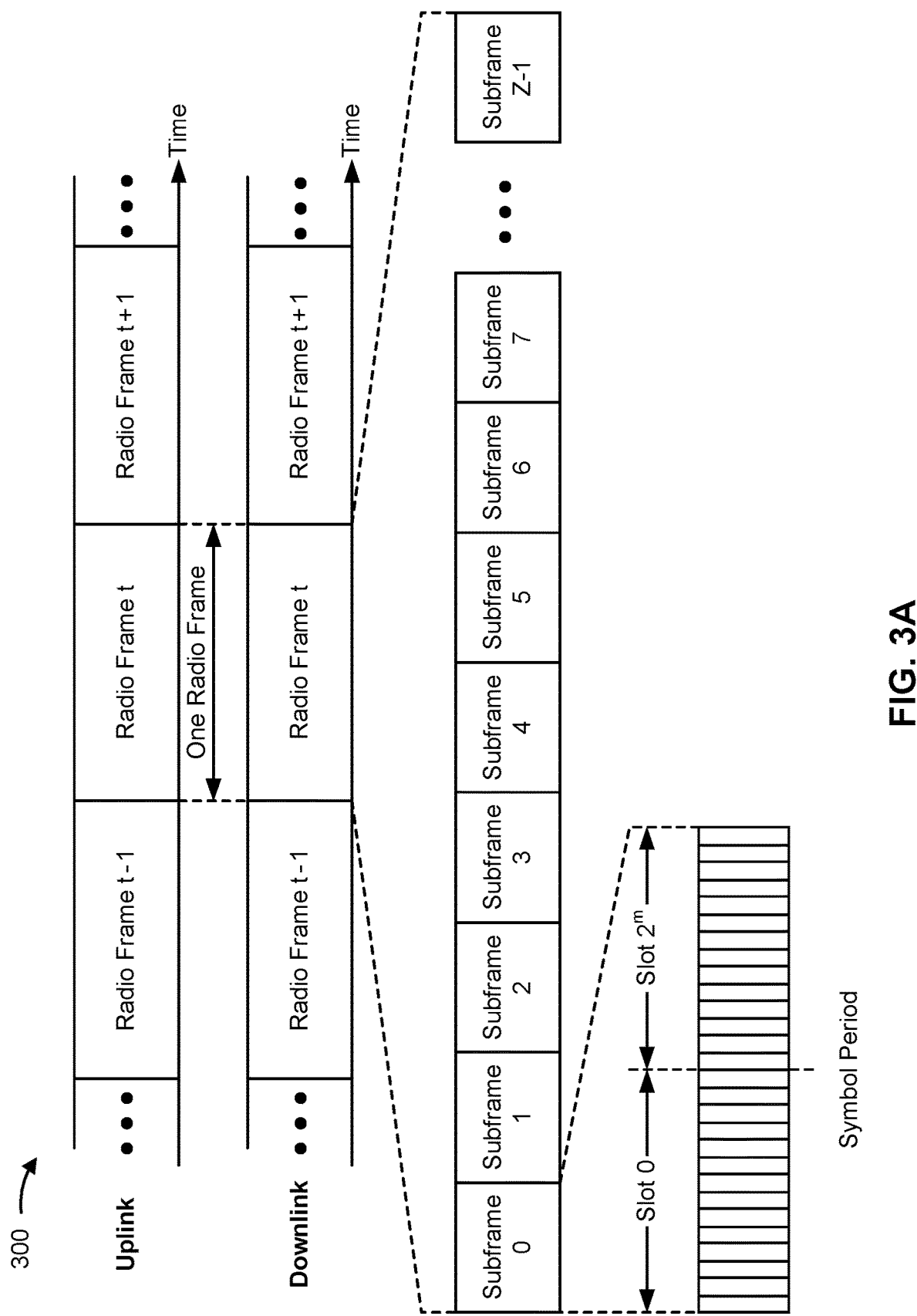
FIG. 3A is a diagram illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
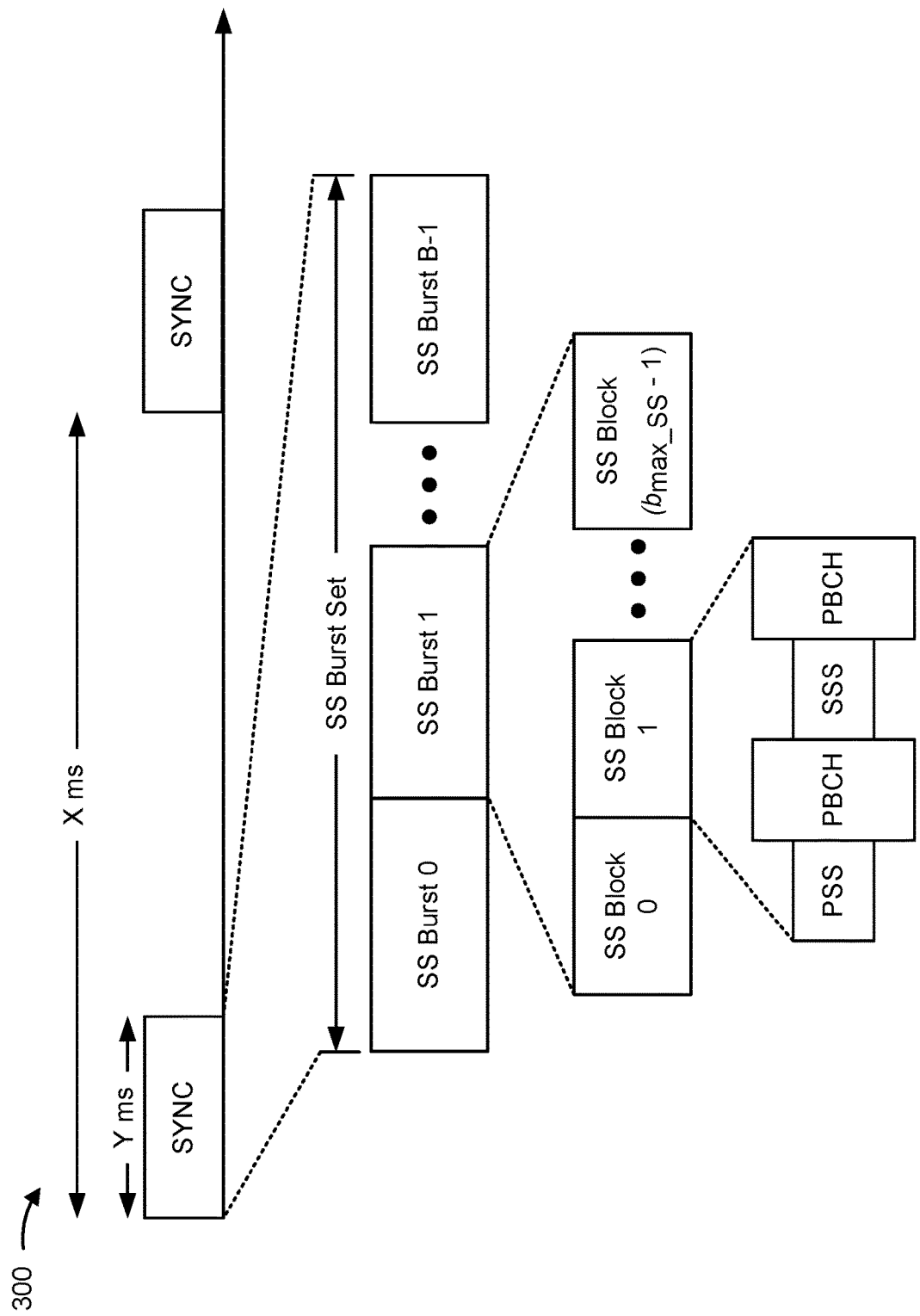
FIG. 3B is a diagram illustrating an example synchronization communication hierarchy in a wireless communication network, in accordance with various aspects of the present disclosure.

FIG. 3B is a diagram illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
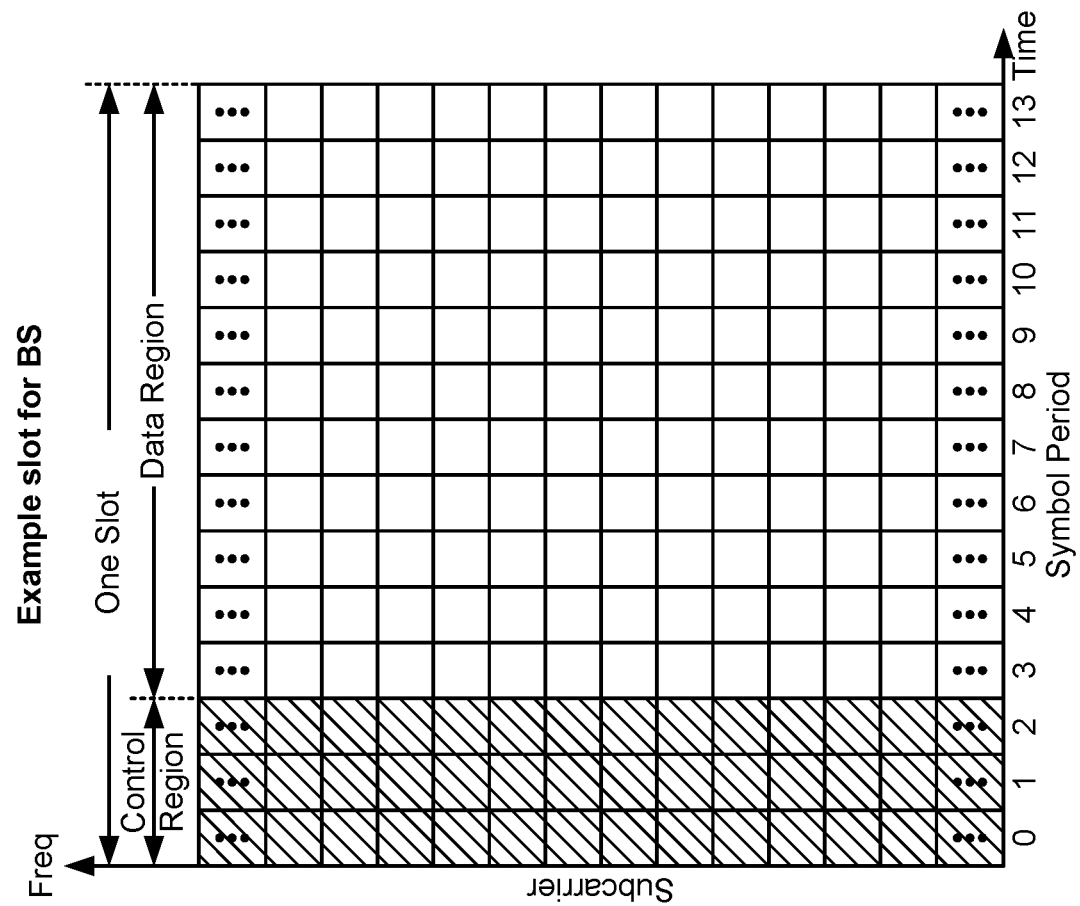
FIG. 4 is a diagram illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 ms duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
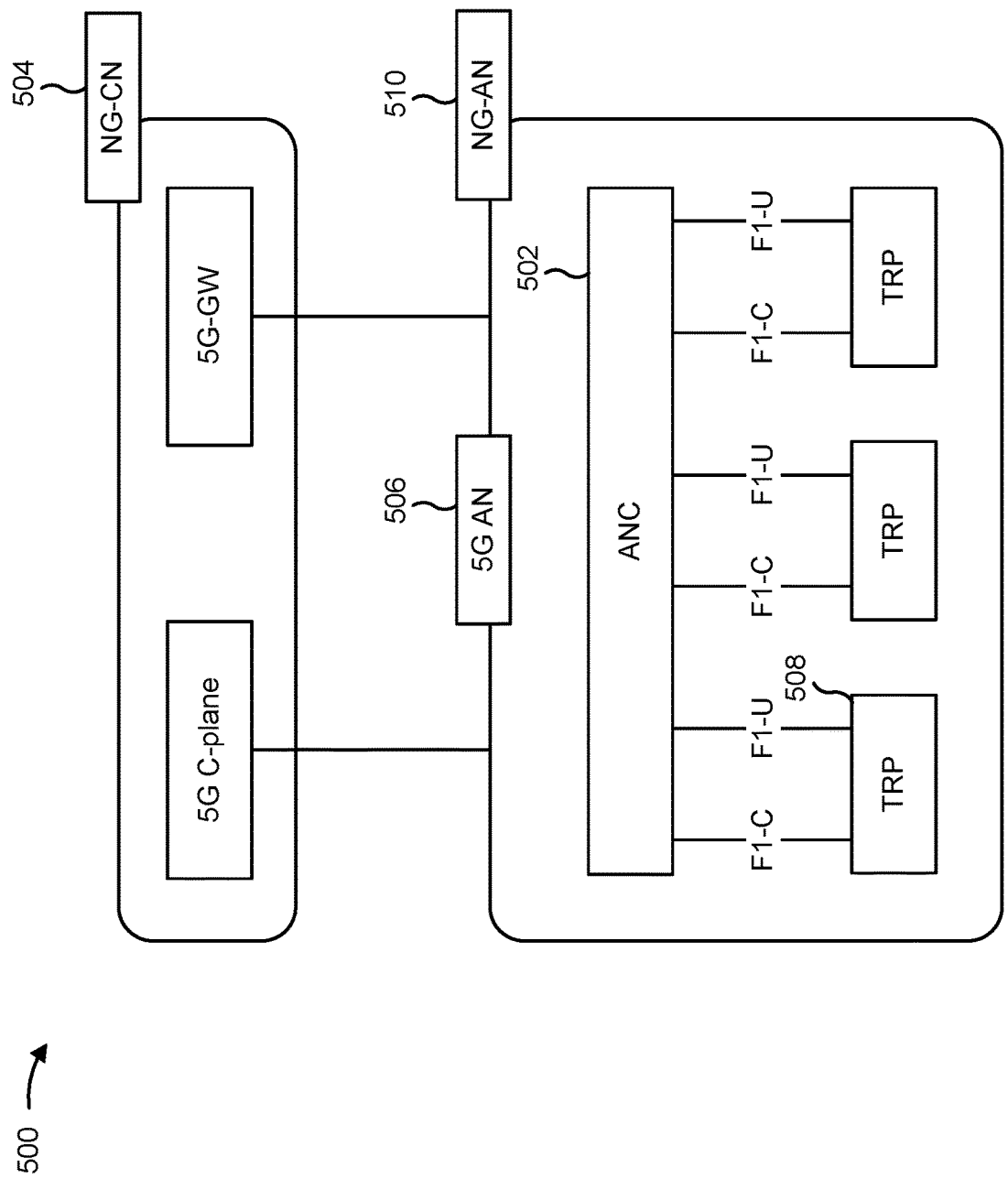
FIG. 5 is a diagram illustrating an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more transmit receive points (TRPs) 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul communication. The architecture may be defined to support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), or medium access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided as an example. Other examples may differ from what is described with regard to FIG. 5.

Figure 6:
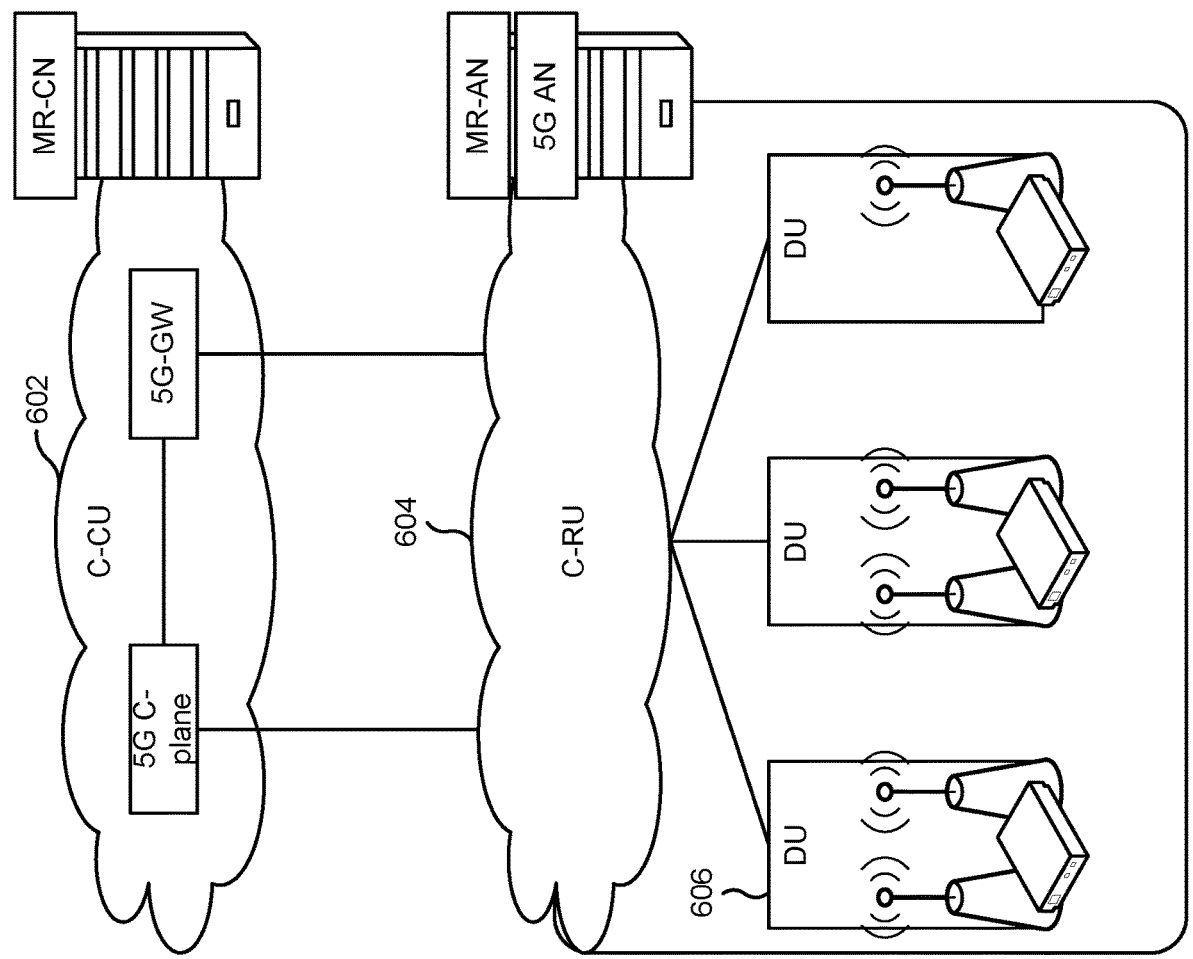
FIG. 6 is a diagram illustrating an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided as an example. Other examples may differ from what is described with regard to FIG. 6.

In some wireless telecommunication systems, a UE may receive multiple downlink control information (DCI) communications from multiple TRPs, for example, to schedule downlink transmissions from the multiple TRPs to the UE. In some cases, the UE may receive a configuration for a semi-persistent scheduling (SPS) of a data transmission. SPS is a mechanism for providing periodic resource allocations for a downlink transmission. For example, an SPS configuration may be associated with a fixed resource block allocation. An SPS communication may be associated with a payload (e.g., a downlink shared channel) and a reference signal, such as a DMRS. In the case of downlink SPS communications, it may be difficult to avoid collisions between the downlink SPS communications, or an associated DMRS, and another downlink signal, channel, or transmission (e.g., a CRS). In such a case, dropping the colliding SPS communication or associated DMRS may impact performance of the downlink SPS communication or associated DMRS.

Some techniques and apparatuses described herein enable avoidance of a potential collision between a downlink SPS communication and a reference signal (e.g., a CRS). For example, in some aspects, a UE may receive a configuration for an SPS of a data transmission that rate matches the data transmission around a CRS pattern associated with one or more TRPs. Some techniques and apparatuses described herein enable avoidance of a potential collision between a reference signal (e.g., a DMRS) associated with an SPS communication and another reference signal (e.g., a CRS). For example, in some aspects, a UE may determine that a resource for receiving a DMRS associated with an SPS communication is to be shifted based at least in part on a scheduling of a DMRS associated with another data transmission. In this way, collision between a downlink SPS communication, or an associated DMRS, and another signal or communication is mitigated, thereby improving performance of the downlink SPS communication, or an associated DMRS, and the other signal or communication.

Figure 7:
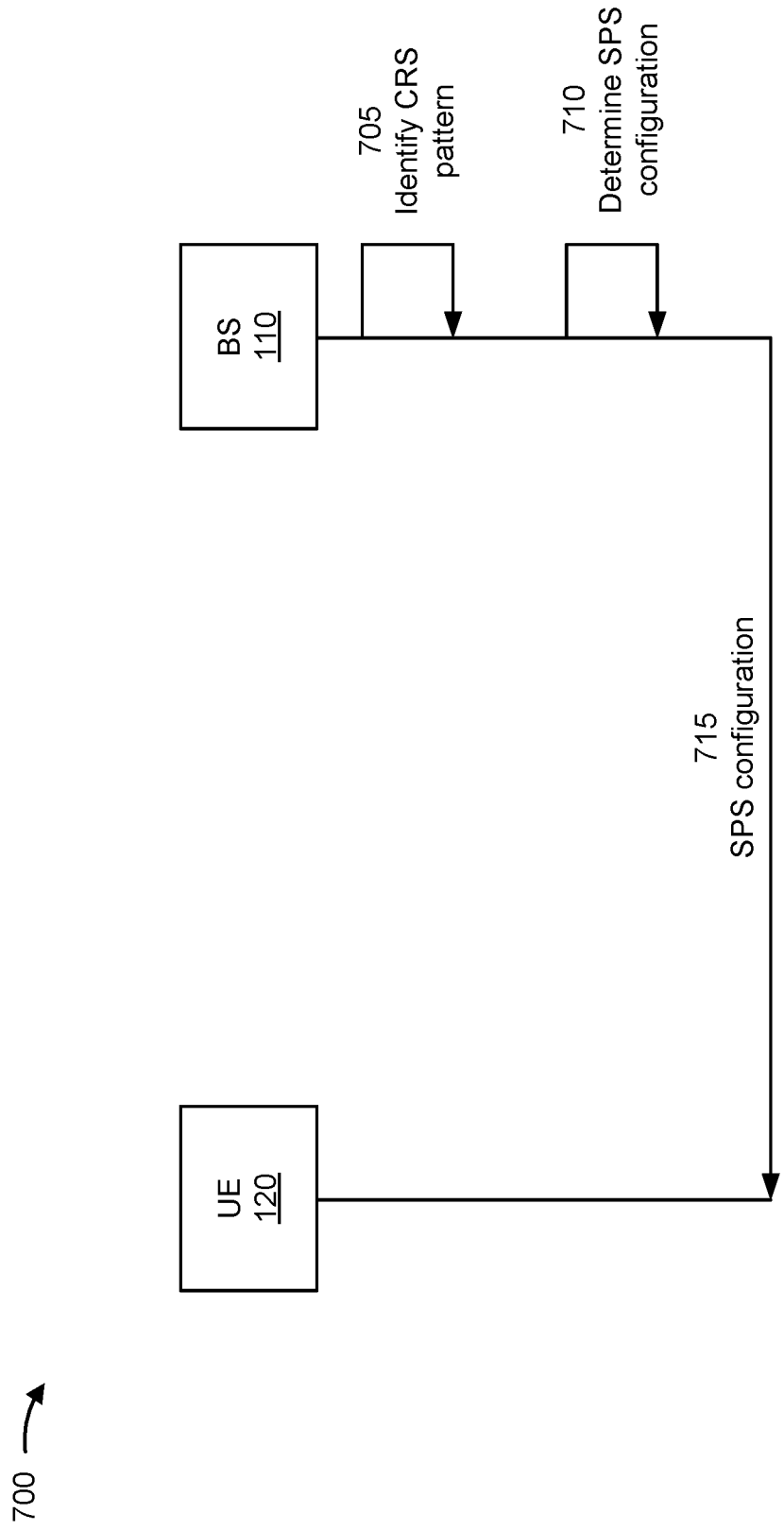
FIGS. 7 and 8 are diagrams illustrating examples of avoiding collisions with reference signals, in accordance with various aspects of the present disclosure.

FIG. 7 is a diagram illustrating an example 700 of avoiding collisions with reference signals, in accordance with various aspects of the present disclosure. As shown in FIG. 7, a UE 120 may be in communication with a BS 110.

In some aspects, the BS 110 may be a TRP (e.g., TRP 508) or may include one or more TRPs.

As shown in FIG. 7, and by reference number 705, the BS 110 may identify a CRS pattern (e.g., a CRS pattern in accordance with an LTE specification). That is, the BS 110 may determine one or more resource elements that are to be used for a CRS pattern. In some aspects, the BS 110 may use the CRS pattern for transmitting (e.g., broadcasting) a CRS. In some aspects, the CRS pattern may be used by one or more TRPs of the BS 110 for transmitting (e.g., broadcasting) a CRS. For example, the CRS pattern may include a first CRS pattern associated with a first TRP of the BS 110 and a second CRS pattern associated with a second TRP of the BS 110. In some aspects, the first TRP and the second TRP may be associated with different BSs 110. In other words, the CRS pattern may be an aggregate of respective CRS patterns used by multiple TRPs (e.g., the first TRP and the second TRP).

The UE 120 may use a CRS for timing and frequency synchronization, for radio resource management (RRM) measurements, for time domain and frequency domain channel estimation, for coherent demodulation, for channel state information (CSI) measurements, and/or the like. In some aspects, each CRS pattern may be associated with a higher-layer-signaling index value per control resource set (CORESET) configured for the UE 120. Accordingly, a CRS pattern, associated with an index value, may be used with a downlink transmission scheduled by DCI detected in a CORESET associated with the same index value.

As shown by reference number 710, the BS 110 may determine an SPS configuration for the UE 120 (e.g., an SPS configuration in accordance with an NR configuration). The SPS configuration may be associated with a downlink data transmission (e.g., a periodic downlink data transmission) to the UE 120. In some aspects, the BS 110 may determine the SPS configuration based at least in part on the identified CRS pattern. For example, the BS 110 may determine the SPS configuration so as to avoid a collision with the identified CRS pattern. In some aspects, the BS 110 may determine an SPS configuration that rate matches the downlink data transmission (e.g., the periodic downlink data transmission) around the CRS pattern (e.g., one or more resource elements used by the CRS pattern). In other words, the SPS configuration may schedule the data transmission in one or more resource elements that do not overlap with one or more resource elements that are to be used for the CRS pattern.

In some aspects, the BS 110 (e.g., a first TRP) may determine an SPS configuration that rate matches a downlink data transmission around a first CRS pattern associated with the first TRP. In some aspects, the BS 110 (e.g., a second TRP) may determine an SPS configuration that rate matches a downlink data transmission around a second CRS pattern associated with the second TRP. In some aspects, the BS 110 (e.g., the first TRP or the second TRP) may determine an SPS configuration that rate matches a downlink data transmission around the first CRS pattern associated with the first TRP and the second CRS pattern associated with the second TRP.

As shown by reference number 715, the BS 110 may transmit, and the UE 120 may receive, the SPS configuration. The UE 120 may receive SPS communications according to the SPS configuration. In this way, the SPS communications received by the UE 120 do not collide with CRSs that are also received by the UE (e.g., due to the rate matching of the SPS communications around the CRS s), thereby improving performance of the SPS communications and the CRSs.

As indicated above, FIG. 7 is provided as an example. Other examples may differ from what is described with respect to FIG. 7.

Figure 8:
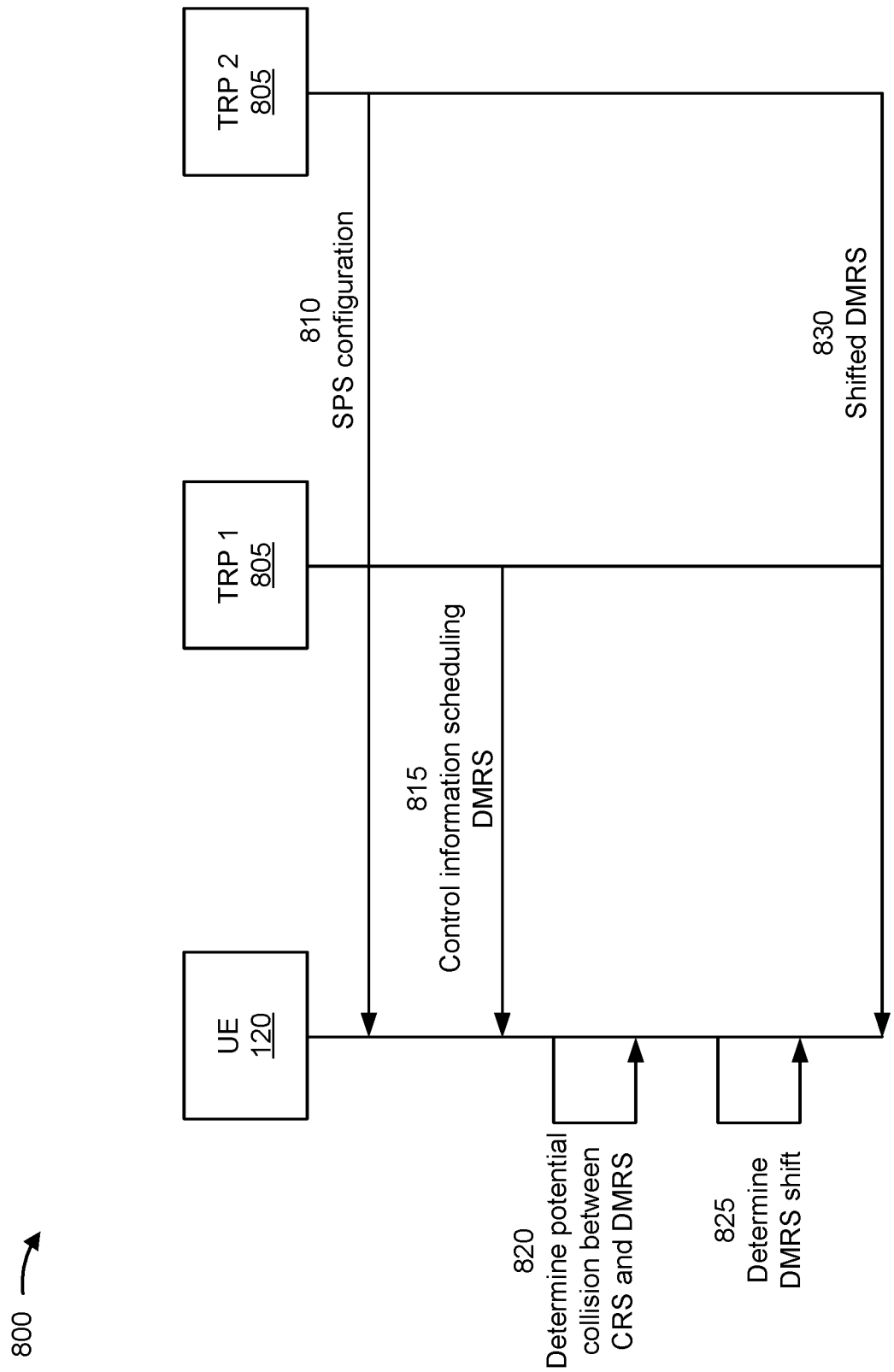

FIG. 8 is a diagram illustrating an example 800 of avoiding collisions with reference signals, in accordance with various aspects of the present disclosure. As shown in FIG. 8, a UE 120 may be in communication with a first TRP 805 and a second TRP 805 in connection with SPS and/or a downlink grant. In some aspects, the first TRP 805 and/or the second TRP 805 may correspond to a TRP 508, a BS 110, and/or the like. In some aspects, the first TRP 805 and the second TRP may be associated with a BS 110 or respective BSs 110.

As shown in FIG. 8, and by reference number 810, the second TRP 805 may transmit, and the UE 120 may receive, an SPS configuration for a data transmission (e.g., a periodic data transmission) of the second TRP 805, for example, as described above in connection with FIG. 7. An SPS communication, according to the SPS configuration, may be associated with a data payload and a DMRS (e.g., a DMRS in accordance with an NR specification). In some aspects, the UE 120 may be configured (e.g., by the SPS configuration) to receive the DMRS of an SPS communication in one or more first resource elements (e.g., in one or more symbols).

As shown by reference number 815, the first TRP 805 may transmit, and the UE 120 may receive, DCI that schedules a first DMRS of a downlink data transmission of the first TRP 805. Accordingly, the first DMRS and associated downlink data transmission may be dynamically scheduled by a downlink grant in the DCI. In some aspects, the DCI may schedule the first DMRS so as to avoid a collision with a CRS in the one or more first resource elements. For example, the DCI may schedule the first DMRS in one or more second resource elements (e.g., shift the first DMRS) in order to avoid the collision with the CRS in the one or more first resource elements. In some aspects, the first TRP 805, a BS 110 associated with the first TRP 805 (e.g., a central unit of the BS 110), and/or the like, may determine the scheduling of the first DMRS so as to avoid the collision.

As shown by reference number 820, the UE 120 may determine a potential collision between a CRS (e.g., a CRS pattern) and a second DMRS associated with an SPS communication, and scheduled in the one or more first resource elements, based at least in part on the DCI. For example, the UE 120 may determine (e.g., infer) that the first DMRS is not scheduled by the DCI in the one or more first resource elements (e.g., the first DMRS has been shifted) because one or more CRSs are scheduled in the one or more first resource elements. Accordingly, the UE 120 may determine that there is a potential collision between the one or more CRSs scheduled (e.g., inferred to be scheduled) in the one or more first resource elements and the second DMRS that is also scheduled in the one or more first resource elements (e.g., by the SPS configuration).

As shown by reference number 825, the UE 120 may determine to shift reception of the second DMRS associated with the SPS communication based on the determined potential collision. For example, the UE 120 may determine that the second DMRS is to be received by the UE 120 in the one or more second resource elements (e.g., symbols) or one or more third resource elements (e.g., symbols) based on the determined potential collision. In some aspects, the UE 120 may determine that the second DMRS is to be shifted in time to a position where the first DMRS is scheduled by the DCI (e.g., the one or more second resource elements). In such a case, the first DMRS may be associated with different code-division multiplexing (CDM) groups than the second DMRS. In some aspects, the UE 120 may determine that the second DMRS is to be shifted in time to another position (e.g., the one or more third resource elements, where the first DMRS is not scheduled by the DCI) based on an offset from the position in which the first DMRS is scheduled.

As shown by reference number 830, the second TRP 805 may transmit, and the UE 120 may receive, the second DMRS shifted relative to an initial configuration of the UE 120 for receiving DMRS (e.g., the SPS configuration). For example, the second TRP 805 may transmit, and the UE 120 may receive, the second DMRS in the one or more second resource elements.

In some aspects, the second TRP 805, a BS 110 associated with the second TRP 805 (e.g., a central unit of the BS 110), and/or the like, may determine to shift transmission of the second DMRS, in a manner similar to that described above. For example, the second TRP, the BS 110, and/or the like, may determine to shift transmission of the second DMRS based at least in part on a determination that the first DMRS is scheduled (e.g., by the DCI) so as to avoid a collision with one or more CRSs in the one or more first resource elements (e.g., the first DMRS is shifted).

Accordingly, the second TRP, the BS 110, and/or the like, may determine a potential collision between the one or more CRSs scheduled in the one or more first resource elements and the second DMRS that is also scheduled in the one or more first resource elements (e.g., by the SPS configuration). Based on the determined potential collision, the second TRP, the BS 110, and/or the like, may determine that the second DMRS is to be transmitted in the one or more second resource elements or the one or more third resource elements, as described above.

In some aspects, the SPS configuration and the DCI may both be associated with one of the first TRP 805 or the second TRP 805, and the second DMRS may be shifted in a manner similar to that described above.

As indicated above, FIG. 8 is provided as an example. Other examples may differ from what is described with respect to FIG. 8.

Figure 9:
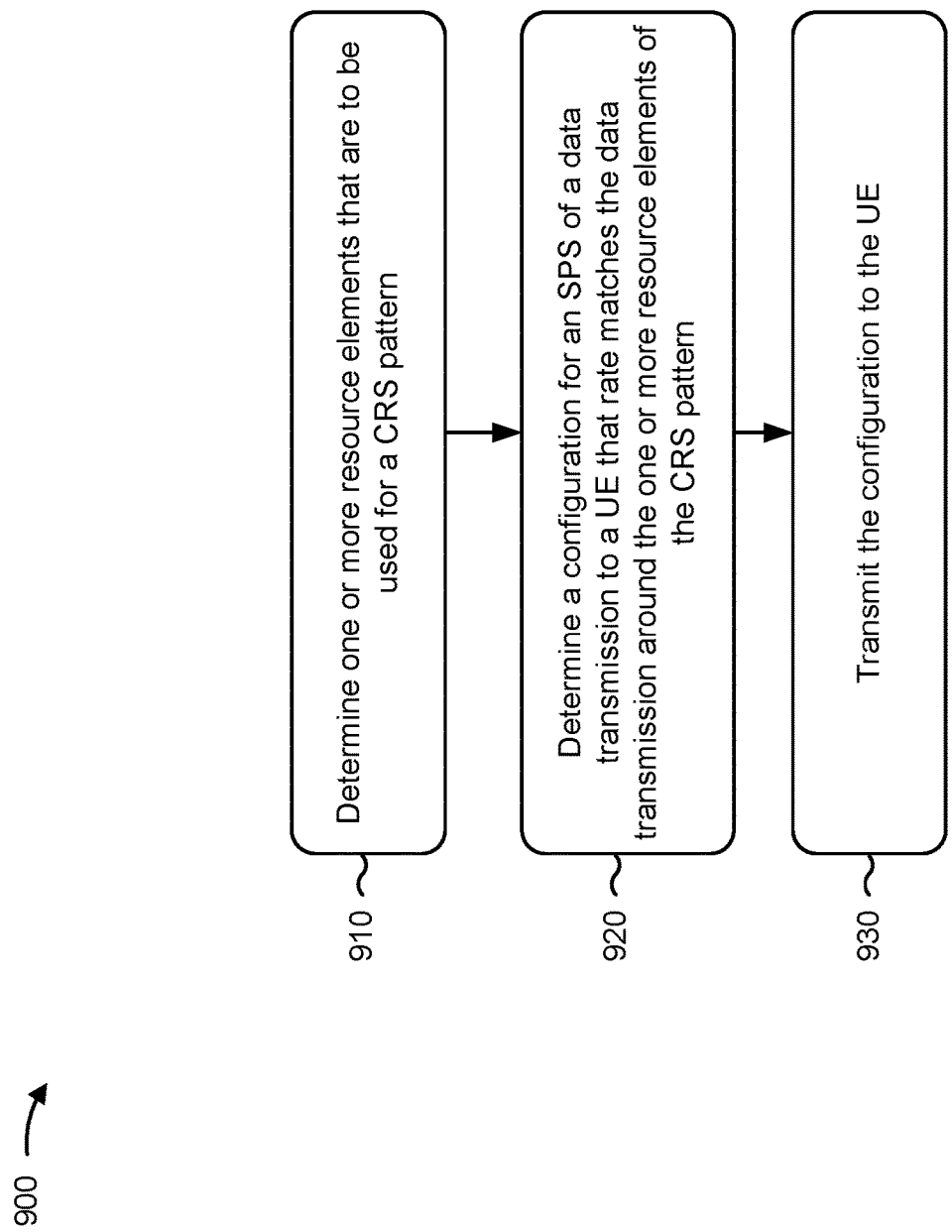
FIGS. 9-12 are diagrams illustrating example processes associated with avoiding collisions with reference signals, in accordance with various aspects of the present disclosure.

FIG. 9 is a diagram illustrating an example process 900 performed, for example, by a BS, in accordance with various aspects of the present disclosure. Example process 900 is an example where a BS (e.g., BS 110, and/or the like) performs operations associated with avoiding collisions with reference signals.

As shown in FIG. 9, in some aspects, process 900 may include determining one or more resource elements that are to be used for a CRS pattern (block 910). For example, the BS (e.g., using controller/processor 240, and/or the like) may determine one or more resource elements that are to be used for a CRS pattern, as described above.

As further shown in FIG. 9, in some aspects, process 900 may include determining a configuration for an SPS of a data transmission to a UE that rate matches the data transmission around the one or more resource elements of the CRS pattern (block 920). For example, the BS (e.g., using controller/processor 240 and/or the like) may determine a configuration for an SPS of a data transmission to a UE that rate matches the data transmission around the one or more resource elements of the CRS pattern, as described above.

As further shown in FIG. 9, in some aspects, process 900 may include transmitting the configuration to the UE (block 930). For example, the BS (e.g., using controller/processor 240, transmit processor 220, TX MIMO processor 230, MOD 232, antenna 234, and/or the like) may transmit the configuration to the UE, as described above.

Process 900 may include additional aspects, such as any single aspect or any combination of aspects described below and/or in connection with one or more other processes described elsewhere herein.

In a first aspect, the CRS pattern is associated with a TRP. In a second aspect, alone or in combination with the first aspect, the CRS pattern includes a first CRS pattern of a first TRP and a second CRS pattern of a second TRP.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
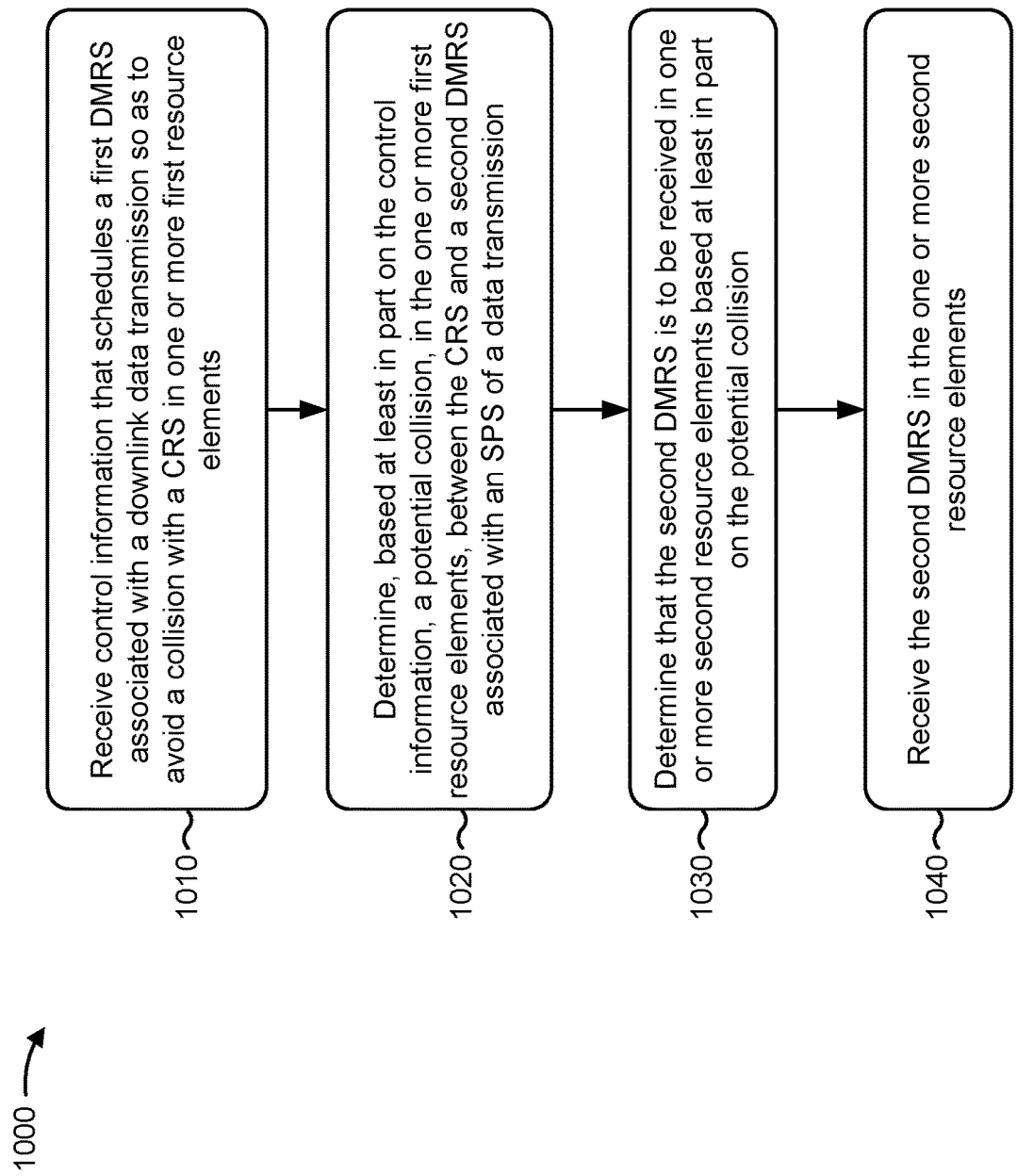

FIG. 10 is a diagram illustrating an example process 1000 performed, for example, by a UE, in accordance with various aspects of the present disclosure. Example process 1000 is an example where a UE (e.g., UE 120, and/or the like) performs operations associated with avoiding collisions with reference signals.

As shown in FIG. 10, in some aspects, process 1000 may include receiving control information that schedules a first DMRS associated with a downlink data transmission so as to avoid a collision with a CRS in one or more first resource elements (block 1010). For example, the UE (e.g., using antenna 252, DEMOD 254, MIMO detector 256, receive processor 258, controller/processor 280, and/or the like) may receive control information that schedules a first DMRS associated with a downlink data transmission so as to avoid a collision with a CRS in one or more first resource elements, as described above.

As further shown in FIG. 10, in some aspects, process 1000 may include determining, based at least in part on the control information, a potential collision, in the one or more first resource elements, between the CRS and a second DMRS associated with an SPS of a data transmission (block 1020). For example, the UE (e.g., using controller/processor 280 and/or the like) may determine, based at least in part on the control information, a potential collision, in the one or more first resource elements, between the CRS and a second DMRS associated with an SPS of a data transmission, as described above.

As further shown in FIG. 10, in some aspects, process 1000 may include determining that the second DMRS is to be received in one or more second resource elements based at least in part on the potential collision (block 1030). For example, the UE (e.g., using controller/processor 280 and/or the like) may determine that the second DMRS is to be received in the one or more second resource elements based at least in part on the potential collision, as described above.

As further shown in FIG. 10, in some aspects, process 1000 may include receiving the second DMRS in the one or more second resource elements (block 1040). For example, the UE (e.g., using antenna 252, DEMOD 254, MIMO detector 256, receive processor 258, controller/processor 280, and/or the like) may receive the second DMRS in the one or more second resource elements, as described above.

Process 1000 may include additional aspects, such as any single aspect or any combination of aspects described below and/or in connection with one or more other processes described elsewhere herein.

In a first aspect, the control information schedules the first DMRS in the one or more second resource elements. In a second aspect, alone or in combination with the first aspect, the downlink data transmission is associated with a first TRP, and the SPS of the data transmission is associated with a second TRP. In a third aspect, alone or in combination with one or more of the first and second aspects, the one or more second resource elements are offset from one or more third resource elements in which the control information schedules the first DMRS.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
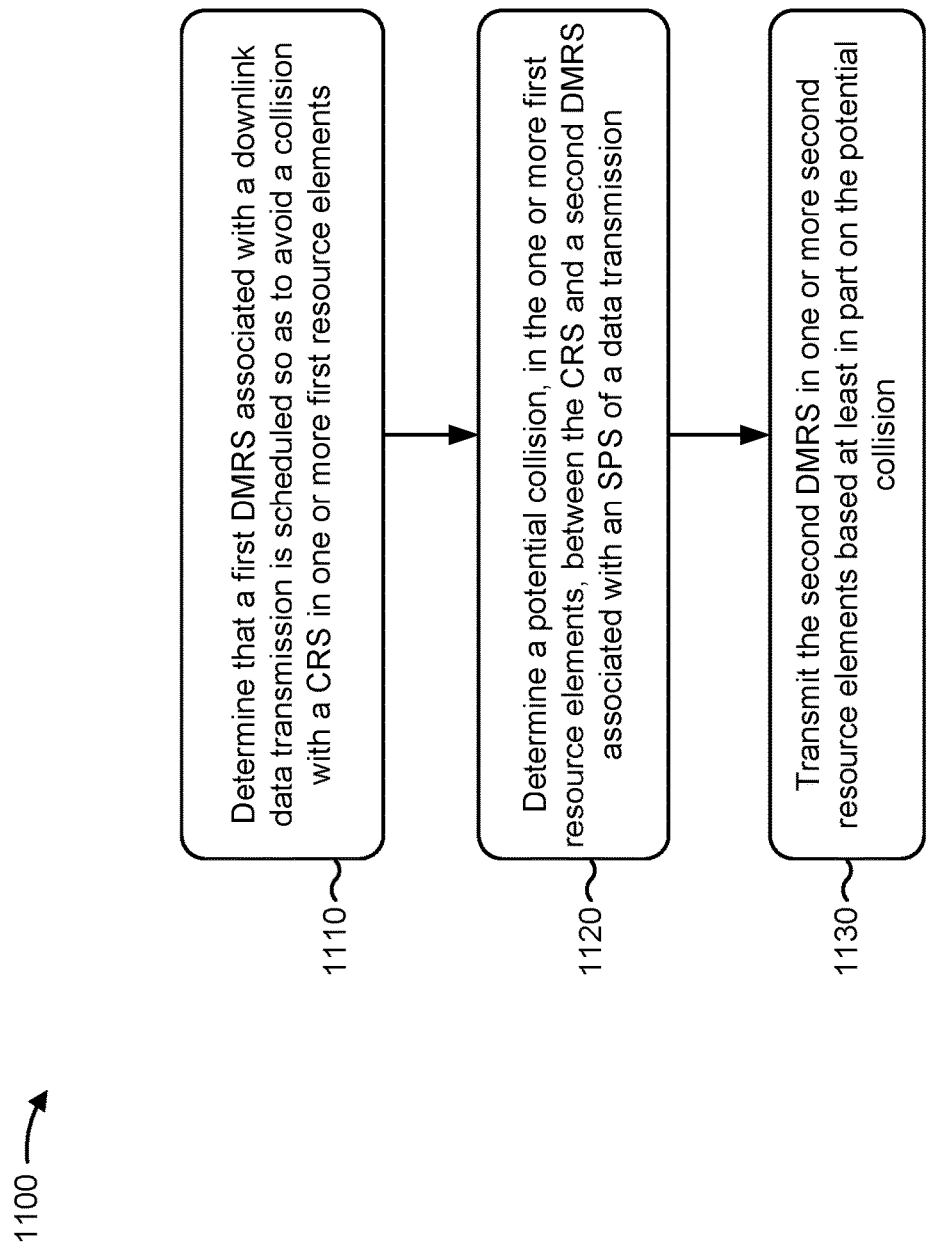

FIG. 11 is a diagram illustrating an example process 1100 performed, for example, by a BS, in accordance with various aspects of the present disclosure. Example process 1100 is an example where a BS (e.g., BS 110, and/or the like) performs operations associated with avoiding collisions with reference signals.

As shown in FIG. 11, in some aspects, process 1100 may include determining that a first DMRS associated with a downlink data transmission is scheduled so as to avoid a collision with a CRS in one or more first resource elements (block 1110). For example, the BS (e.g., using controller/processor 240, and/or the like) may determine that a first DMRS associated with a downlink data transmission is scheduled so as to avoid a collision with a CRS in one or more first resource elements, as described above.

As further shown in FIG. 11, in some aspects, process 1100 may include determining a potential collision, in the one or more first resource elements, between the CRS and a second DMRS associated with an SPS of a data transmission (block 1120). For example, the BS (e.g., using controller/processor 240, and/or the like) may determine a potential collision, in the one or more first resource elements, between the CRS and a second DMRS associated with an SPS of a data transmission, as described above.

As further shown in FIG. 11, in some aspects, process 1100 may include transmitting the second DMRS in one or more second resource elements based at least in part on the potential collision (block 1130). For example, the BS (e.g., using controller/processor 240, transmit processor 220, TX MIMO processor 230, MOD 232, antenna 234, and/or the like) may transmit the second DMRS in one or more second resource elements based at least in part on the potential collision, as described above.

Process 1100 may include additional aspects, such as any single aspect or any combination of aspects described below and/or in connection with one or more other processes described elsewhere herein.

In a first aspect, the first DMRS is scheduled in the one or more second resource elements. In a second aspect, alone or in combination with the first aspect, the downlink data transmission is associated with a first TRP, and the SPS of the data transmission is associated with a second TRP. In a third aspect, alone or in combination with one or more of the first and second aspects, the one or more second resource elements are offset from one or more third resource elements in which the first DMRS is scheduled.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
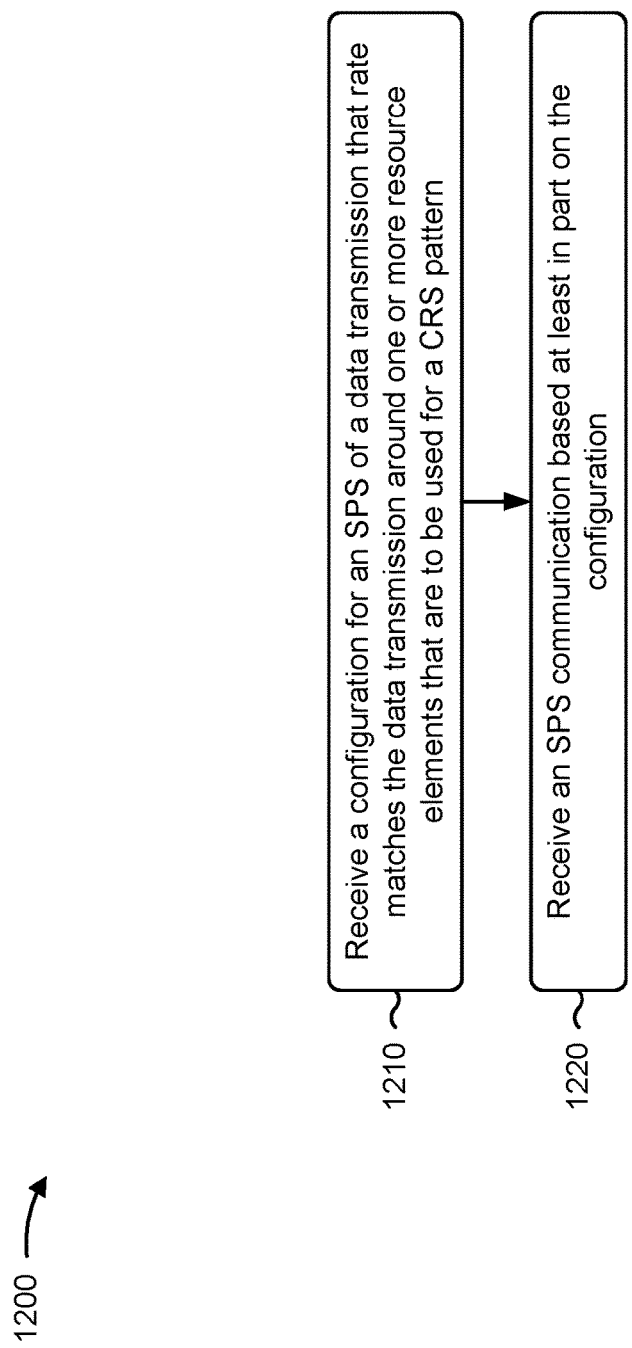

FIG. 12 is a diagram illustrating an example process 1200 performed, for example, by a UE, in accordance with various aspects of the present disclosure. Example process 1200 is an example where the UE (e.g., UE 120) performs operations associated with avoiding collisions with reference signals.

As shown in FIG. 12, in some aspects, process 1200 may include receiving a configuration for an SPS of a data transmission that rate matches the data transmission around one or more resource elements that are to be used for a CRS pattern (block 1210). For example, the UE (e.g., using antenna 252, demodulator 254, MIMO detector 256, receive processor 258, controller/processor 280, and/or memory 282) may receive a configuration for an SPS of a data transmission that rate matches the data transmission around one or more resource elements that are to be used for a CRS pattern, as described above.

As further shown in FIG. 12, in some aspects, process 1200 may include receiving an SPS communication based at least in part on the configuration (block 1220). For example, the UE (e.g., using antenna 252, demodulator 254, MIMO detector 256, receive processor 258, controller/processor 280, and/or memory 282) may receive an SPS communication based at least in part on the configuration, as described above.

Process 1200 may include additional aspects, such as any single aspect or any combination of aspects described below and/or in connection with one or more other processes described elsewhere herein.

In a first aspect, the CRS pattern is associated with a TRP. In a second aspect, alone or in combination with the first aspect, the CRS pattern includes a first CRS pattern of a first TRP and a second CRS pattern of a second TRP.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
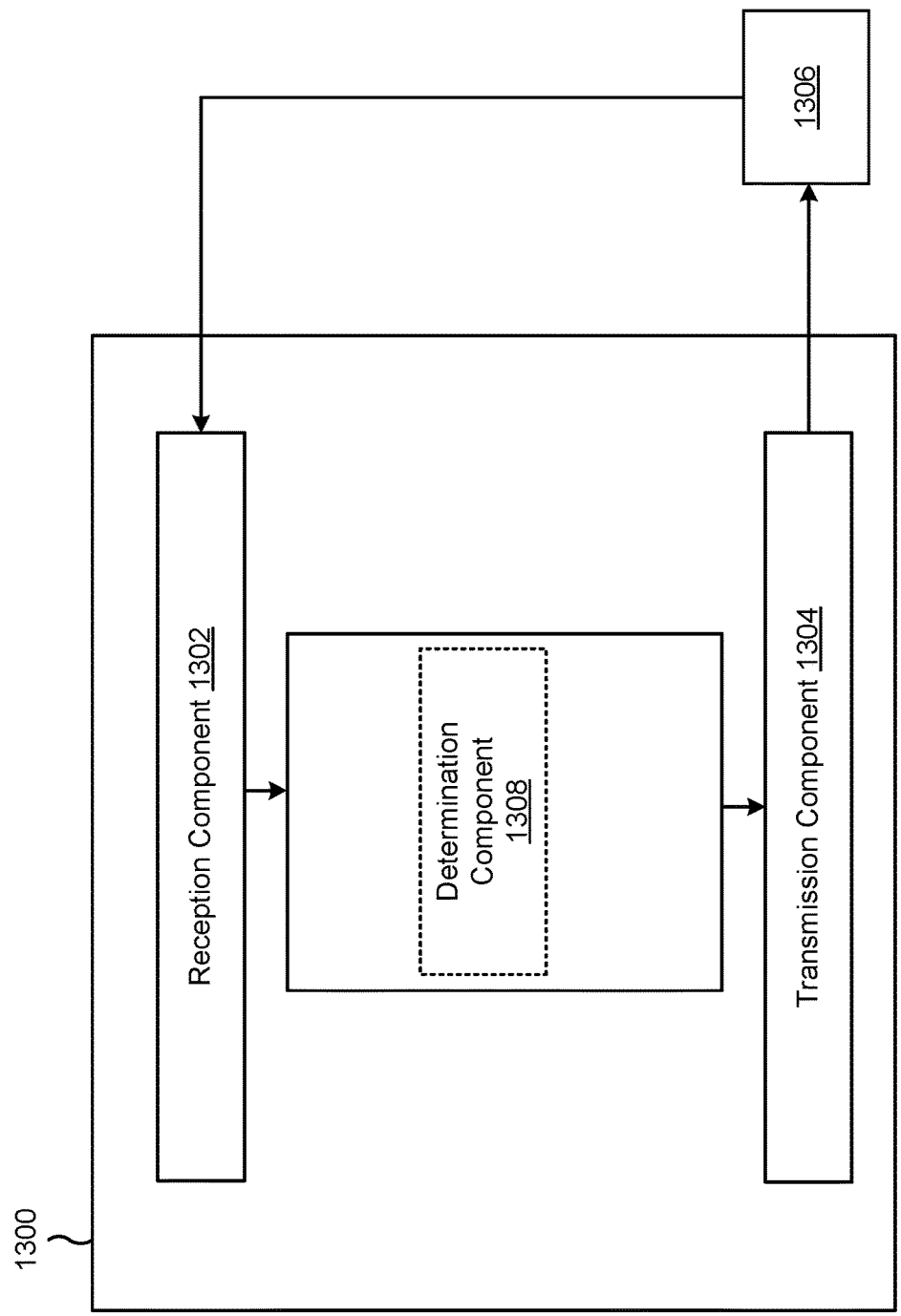
FIGS. 13 and 14 are diagrams illustrating example apparatuses for wireless communication, in accordance with various aspects of the present disclosure.

FIG. 13 is a diagram of an example apparatus 1300 for wireless communication, in accordance with various aspects of the present disclosure. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a determination component 1308, among other examples.

In some aspects, the apparatus 1300 may be configured to perform one or more operations described herein in connection with FIGS. 7-8. Additionally, or alternatively, the apparatus 1300 may be configured to perform one or more processes described herein, such as process 1000 of FIG. 10, process 1200 of FIG. 12, or a combination thereof. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The reception component 1302 may receive a configuration for an SPS of a data transmission that rate matches the data transmission around one or more resource elements that are to be used for a CRS pattern. The reception component 1302 may receive an SPS communication based at least in part on the configuration.

The reception component 1302 may receive control information that schedules a first DMRS associated with a downlink data transmission so as to avoid a collision with a CRS in one or more first resource elements. The determination component 1308 may determine, based at least in part on the control information, a potential collision, in the one or more first resource elements, between the CRS and a second DMRS associated with an SPS of a data transmission. In some aspects, the determination component 1308 may include a controller/processor, a memory, or a combination thereof, of the UE described above in connection with FIG. 2. The determination component 1308 may determine that the second DMRS is to be received in one or more second resource elements based at least in part on the potential collision. The reception component 1302 may receive the second DMRS in the one or more second resource elements.

The quantity and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
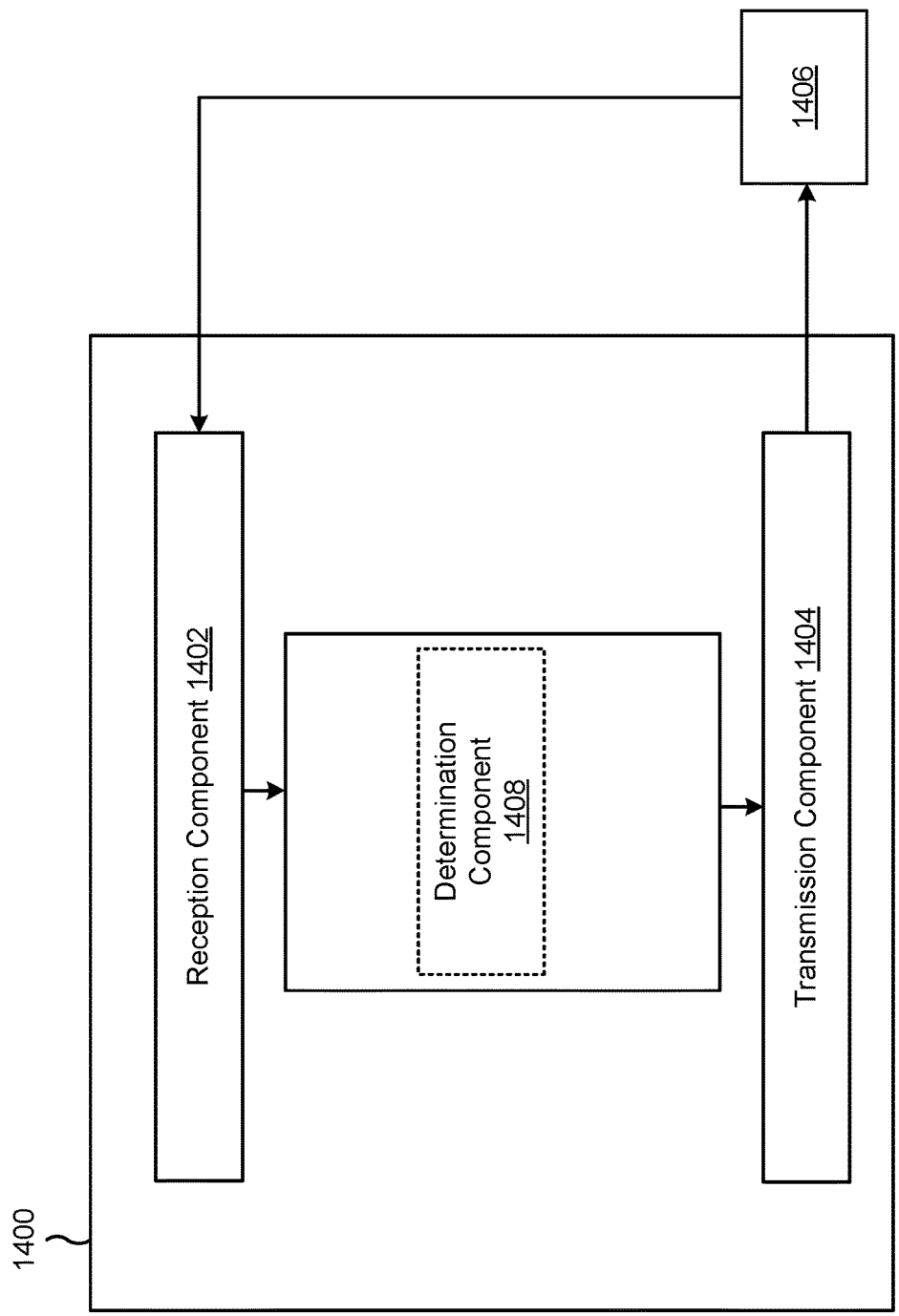

FIG. 14 is a diagram of an example apparatus 1400 for wireless communication, in accordance with various aspects of the present disclosure. The apparatus 1400 may be a BS, or a BS may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a determination component 1408, among other examples.

In some aspects, the apparatus 1400 may be configured to perform one or more operations described herein in connection with FIGS. 7-8. Additionally, or alternatively, the apparatus 1400 may be configured to perform one or more processes described herein, such as process 900 of FIG. 9, process 1100 of FIG. 11, or a combination thereof. In some aspects, the apparatus 1400 and/or one or more components shown in FIG. 14 may include one or more components of the BS described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the BS described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the BS described above in connection with FIG. 2. In some aspects, the transmission component 1404 may be co-located with the reception component 1402 in a transceiver.

The determination component 1408 may determine one or more resource elements that are to be used for a CRS pattern. In some aspects, the determination component 1408 may include a controller/processor, a memory, or a combination thereof, of the BS described above in connection with FIG. 2. The determination component 1408 may determine a configuration for an SPS of a data transmission to a UE that rate matches the data transmission around the one or more resource elements of the CRS pattern. The transmission component 1404 may transmit the configuration to the UE.

The determination component 1408 may determine that a first DMRS associated with a downlink data transmission is scheduled so as to avoid a collision with a CRS in one or more first resource elements. The determination component 1408 may determine a potential collision, in the one or more first resource elements, between the CRS and a second DMRS associated with an SPS of a data transmission. The transmission component 1404 may transmit the second DMRS in one or more second resource elements based at least in part on the potential collision.

The quantity and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving control information that schedules a first demodulation reference signal (DMRS) associated with a downlink data transmission so as to avoid a collision with a cell-specific reference signal (CRS) in one or more first resource elements;
   determining, based at least in part on the control information, a potential collision, in the one or more first resource elements, between the CRS and a second DMRS associated with a semi-persistent scheduling (SPS) of a data transmission;
   determining that the second DMRS is to be shifted to a position associated with one or more second resource elements based at least in part on the potential collision, wherein the downlink data transmission is associated with a first CRS pattern of a first cell, and the SPS of the data transmission is associated with a second CRS pattern of a second cell; and
   receiving the second DMRS in the one or more second resource elements.

2. The method of claim 1, wherein the control information schedules the first DMRS in the one or more second resource elements.

3. The method of claim 1, wherein the one or more second resource elements are offset from one or more third resource elements in which the control information schedules the first DMRS.

4. The method of claim 1, wherein the downlink data transmission is associated with a first transmit receive point (TRP), and the SPS of the data transmission is associated with a second TRP.

5. A method of wireless communication performed by a base station, comprising:
- determining that a first demodulation reference signal (DMRS) associated with a downlink data transmission is scheduled so as to avoid a collision with a cell-specific reference signal (CRS) in one or more first resource elements;
- determining a potential collision, in the one or more first resource elements, between the CRS and a second DMRS associated with a semi-persistent scheduling (SPS) of a data transmission, wherein the second DMRS is shifted to a position of one or more second resource elements, and wherein the downlink data transmission is associated with a first CRS pattern of a first cell, and the SPS of the data transmission is associated with a second CRS pattern of a second cell; and
- transmitting the second DMRS in the one or more second resource elements based at least in part on the potential collision.

6. The method of claim 5, wherein the first DMRS is scheduled in the one or more second resource elements.

7. The method of claim 5, wherein the one or more second resource elements are offset from one or more third resource elements in which the first DMRS is scheduled.

8. The method of claim 5, wherein the downlink data transmission is associated with a first transmit receive point (TRP), and the SPS of the data transmission is associated with a second TRP.

9. The method of claim 5, wherein the downlink data transmission is associated with a first base station associated with the first cell, and the SPS of the data transmission is associated with a second base station associated with the second cell.

10. The method of claim 5, wherein the second DMRS is shifted in time to the position of the one or more second resource elements, and wherein the first DMRS and the second DMRS are associated with different code-division multiplexing (CDM) groups.

11. The method of claim 1, wherein the downlink data transmission is associated with a first base station associated with the first cell, and the SPS of the data transmission is associated with a second base station associated with the second cell.

12. The method of claim 1, wherein the second DMRS is shifted in time to the position of the one or more second resource elements, and wherein the first DMRS and the second DMRS are associated with different code-division multiplexing (CDM) groups.

13. The method of claim 1, further comprising:
- determining that the second DMRS is to be shifted in time to the position associated with the one or more second resource elements based on an offset from a position of one or more third resource elements via which the first DMRS is to be received.

14. A user equipment (UE) for wireless communication, comprising:
- one or more memories; and
- one or more processors coupled to the one or more memories, the one or more processors individually or collectively configured to cause the UE to:
  - receive control information that schedules a first demodulation reference signal (DMRS) associated with a downlink data transmission so as to avoid a collision with a cell-specific reference signal (CRS) in one or more first resource elements;
  - determine, based at least in part on the control information, a potential collision, in the one or more first resource elements, between the CRS and a second DMRS associated with a semi-persistent scheduling (SPS) of a data transmission;
  - determine that the second DMRS is to be shifted to a position associated with one or more second resource elements based at least in part on the potential collision, wherein the downlink data transmission is associated with a first CRS pattern of a first cell, and the SPS of the data transmission is associated with a second CRS pattern of a second cell; and
  - receive the second DMRS in the one or more second resource elements.

15. The UE of claim 14, wherein the control information schedules the first DMRS in the one or more second resource elements.

16. The UE of claim 14, wherein the one or more second resource elements are offset from one or more third resource elements in which the control information schedules the first DMRS.

17. The UE of claim 14, wherein the downlink data transmission is associated with a first transmit receive point (TRP), and the SPS of the data transmission is associated with a second TRP.

18. The UE of claim 14, wherein the downlink data transmission is associated with a first base station associated with the first cell, and the SPS of the data transmission is associated with a second base station associated with the second cell.

19. The UE of claim 14, wherein the second DMRS is shifted in time to the position of the one or more second resource elements, and wherein the first DMRS and the second DMRS are associated with different code-division multiplexing (CDM) groups.

20. The UE of claim 14, wherein the one or more processors are further configured to cause the UE to:
- determine that the second DMRS is to be shifted in time to the position associated with the one or more second resource elements based on an offset from a position of one or more third resource elements via which the first DMRS is to be received.

21. A base station for wireless communication, comprising:
- one or more memories; and
- one or more processors coupled to the one or more memories, the one or more processors individually or collectively configured to cause the base station to:
  - determine that a first demodulation reference signal (DMRS) associated with a downlink data transmission is scheduled so as to avoid a collision with a cell-specific reference signal (CRS) in one or more first resource elements;
  - determine a potential collision, in the one or more first resource elements, between the CRS and a second DMRS associated with a semi-persistent scheduling (SPS) of a data transmission, wherein the second DMRS is shifted to a position associated with one or more second resource elements, and wherein the downlink data transmission is associated with a first CRS pattern of a first cell, and the SPS of the data transmission is associated with a second CRS pattern of a second cell; and
  - transmit the second DMRS in the one or more second resource elements based at least in part on the potential collision.

22. The base station of claim 21, wherein the first DMRS is scheduled in the one or more second resource elements.

23. The base station of claim 21, wherein the one or more second resource elements are offset from one or more third resource elements in which the first DMRS is scheduled.

24. The base station of claim 21, wherein the downlink data transmission is associated with a first transmit receive point (TRP), and the SPS of the data transmission is associated with a second TRP.

25. The base station of claim 21, wherein the downlink data transmission is associated with a first base station associated with the first cell, and the SPS of the data transmission is associated with a second base station associated with the second cell.

26. The base station of claim 21, wherein the second DMRS is shifted in time to the position of the one or more second resource elements, and wherein the first DMRS and the second DMRS are associated with different code-division multiplexing (CDM) groups.

27. The method of claim 1, wherein the first CRS pattern and the second CRS pattern are associated with respective higher-layer-signaling index values per control resource set configured for the UE.

28. The method of claim 5, wherein the first CRS pattern and the second CRS pattern are associated with respective higher-layer-signaling index values per control resource set configured for a user equipment (UE).

29. The UE of claim 14, wherein the first CRS pattern and the second CRS pattern are associated with respective higher-layer-signaling index values per control resource set configured for the UE.

30. The base station of claim 21, wherein the first CRS pattern and the second CRS pattern are associated with respective higher-layer-signaling index values per control resource set configured for a user equipment (UE).

* * * * *